ary Examiner—Melvyn I. Marquis

United States Patent [19]

Davis et al.

[11] 4,352,742
[45] Oct. 5, 1982

[54] ALCOHOL COMPOSITION CONTAINING NOVEL HYDROXY-SUBSTITUTED ALIPHATIC SILICONE SULFONATE-SILICATE COPOLYMERS

[75] Inventors: Pauls Davis, Gibraltar; Joe C. Wilson, Woodhaven, both of Mich.

[73] Assignee: BASF Wyandotte Corporation, Wyandotte, Mich.

[21] Appl. No.: 250,050

[22] Filed: Apr. 1, 1981

[51] Int. Cl.$^3$ .................... C09K 15/32; C09K 15/10; C23F 11/10
[52] U.S. Cl. .................... 252/75; 524/588; 252/73; 252/76; 252/77; 252/78.1; 422/7; 422/13; 422/14; 422/17; 528/25; 528/27; 528/30; 528/33
[58] Field of Search .................... 252/73, 75, 76, 77, 252/78.1; 528/25, 27, 30; 260/29.2 R, 29.2 M, 29.2 N; 422/13, 7, 14, 17

[56] References Cited

U.S. PATENT DOCUMENTS

| | | | |
|---|---|---|---|
| 3,198,820 | 8/1965 | Pines et al. | 260/448.2 |
| 3,203,969 | 8/1965 | Pines et al. | 260/448.2 |
| 3,248,329 | 4/1966 | Pines et al. | 252/78 |
| 3,312,622 | 4/1967 | Pines et al. | 252/75 |
| 3,337,496 | 8/1967 | Pines et al. | 528/25 |
| 3,507,897 | 4/1970 | Kanner et al. | 260/448.2 |
| 4,042,612 | 8/1977 | Magee | 528/25 |
| 4,209,416 | 6/1980 | Hirozawa et al. | 252/76 |
| 4,234,440 | 11/1980 | Hirozawa et al. | 252/76 |
| 4,241,016 | 12/1980 | Hirozawa et al. | 252/73 |

Primary Examiner—Melvyn I. Marquis
Assistant Examiner—Herbert J. Lilling
Attorney, Agent, or Firm—Andrew E. Pierce

[57] ABSTRACT

Hydroxy-substituted aliphatic silicone sulfonate-silicate copolymers are useful metal corrosion inhibitors for metals that come in contact with aqueous liquids. Antifreeze concentrates and a process for inhibiting the corrosion of metals below sodium in the electromotive series which come in contact with aqueous liquids are disclosed.

12 Claims, No Drawings

ALCOHOL COMPOSITION CONTAINING NOVEL HYDROXY-SUBSTITUTED ALIPHATIC SILICONE SULFONATE-SILICATE COPOLYMERS

BACKGROUND OF THE INVENTION

1. Field of the Invention

This invention relates to novel aliphatic silicone sulfonate-silicate copolymers and to corrosion inhibited aqueous solutions containing said polymers and particularly to antifreeze concentrates useful upon dilution with water as coolants in heat-exchange systems such as the cooling system of an internal combustion engine.

2. Prior Art

Kanner et al disclose in U.S. Pat. No. 3,507,897, hydroxy-substituted aliphatic silicone sulfonate copolymers with alkyl or aryl siloxanes for use as surfactants. Pines in U.S. Pat. Nos. 3,341,469 and 3,337,496 disclose organosiloxane-silicate copolymers useful for inhibiting the corrosion of metals in contact with aqueous liquids. Additional organosiloxane-silicate copolymers useful as corrosion inhibitors are disclosed in U.S. Pat. Nos. 3,312,622; 3,198,820; 3,203,969; and 3,248,329.

SUMMARY OF THE INVENTION

Copolymers of an aliphatic hydroxy-substituted silicone sulfonate with a water-soluble silicate have been found useful as corrosion inhibitors to protect against the corrosion of metals below sodium in the electromotive series that come in contact with aqueous liquids. The novel copolymers of the invention are useful in the preparation of antifreeze concentrates which, upon dilution with water, are useful as coolants, for instance, in the cooling system of an internal combustion engine. A process for inhibiting the corrosion of metals below sodium in the electromotive series is also disclosed.

DETAILED DESCRIPTION OF THE INVENTION

The copolymers of the invention are prepared by reacting an hydroxy-substituted aliphatic silicone sulfonate with a water-soluble silicate. By reacting the water-soluble silicate with said silicone sulfonate, the gel tendencies of water-soluble silicates in aqueous media can be inhibited thus prolonging the effectiveness of water-soluble silicates as corrosion inhibitors for metals below sodium in the electromotive series that come in contact with aqueous liquids.

The copolymers of this invention contain from 0.1 to 99.9 parts by weight (per 100 parts by weight of the copolymer) of at least one siloxane group derived from hydroxy-substituted aliphatic silicone sulfonates represented by the formula:

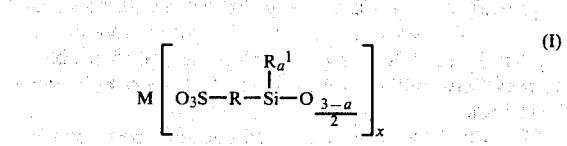

(I)

wherein M is a monovalent, divalent or trivalent cation preferably a monovalent cation selected from the group consisting of alkali metal, ammonium, hydrogen, and tetraorganoammonium; x is 1 to 3 and equal to the valence of M; R is a hydroxy-substituted aliphatic divalent group having 3 to about 18 carbon atoms preferably selected from the group consisting of hydroxy-substituted alkylene and cycloalkylene, alkylene oxyalkylene, and cycloalkylene oxyalkylene groups and said hydroxy substituent is bonded to a carbon atom vicinal to the carbon atom to which the $-O_3S-$ group is bonded; $R^1$ is a monovalent alkyl group preferably selected from the group consisting of alkyl and cycloalkyl of 1 to about 8 carbon atoms, and a is an integer of 0 to 2 and from 0.1 to 99.9 parts by weight (per 100 parts by weight of the copolymer) of at least one silicate group derived from silicates having the formula:

(II)

wherein X is a cation that forms a water-soluble silicate preferably selected from the group consisting of at least one alkali metal, ammonium, and tetraorganoammonium cation; d is the valence of the cation represented by X and has a value of at least 1; and e has a value of from 1 to 3, said parts by weight being based upon 100 parts by weight of said copolymer. Most preferably, X is inorganic and selected from the group consisting of sodium, potassium, lithium, and rubidium.

Preferably, the copolymers of this invention contain about 15 to about 45 parts by weight (per 100 parts by weight of said copolymer) of repeating hydroxy-substituted aliphatic silicone sulfonate members derived from said silicone sulfonates as described above and about 55 to about 85 parts by weight (per 100 parts by weight of said copolymer) of repeating groups derived from the water-soluble silicate described above. Most preferably, said copolymers contain about 15 to about 25 parts by weight of said silicone and about 75 to about 85 parts by weight of said silicate.

Such hydroxy-substituted aliphatic silicone sulfonates can be obtained in high yields by reaction of epoxy or more specifically, glycidoxy silicone compositions with a bisulfite salt in the presence of relatively minor amounts of a sulfite salt. The silicone sulfonate compositions useful in the preparation of the copolymers of the invention are disclosed, together with processes for their preparation, in U.S. Pat. No. 3,507,897, incorporated herein by reference.

Typical monovalent metal cations represented by M in the above-described structural formula for the hydroxy-substituted aliphatic silicone sulfonate are sodium, potassium, lithium, rubidium, cesium, ammonium or tetraalkylammonium. Illustrative divalent metal cations represented by M are barium, calcium, strontium, zinc, cadmium, magnesium, iron, cobalt, nickel, copper, tin, lead, mercury and the like. Useful trivalent metal cations represented by M are aluminum, nickel, tin, and the like. Preferably the cation represented by M is an inorganic cation.

Representative alkyl groups for $R^1$ in the above-structural formula for the hydroxy-substituted aliphatic silicone sulfonate are alkyl or cycloaliphatic groups having 1 to about 8 carbon atoms such as methyl, ethyl, propyl and cyclohexyl. Illustrative R groups are hydroxy-substituted alkylene, alkylene oxyalkylene, hydroxy-substituted cycloalkylene, and cycloalkylene oxyalkylene groups, and the like.

The water-soluble silicates used in producing the copolymers of the invention are specifically represented by the alkali metal orthosilicates, the alkali metal metasilicates, the alkali metal tetrasilicates, the alkali metal disilicates, and the tetra(organo)ammonium silicates. Specific examples of silicates under each class of the above silicates are potassium metasilicate, sodium orthosilicate, potassium disilicate, lithium orthosilicate, lithium metasilicate, lithium disilicate, rubidium disilicate, rubidium tetrasilicate, mixed alkali metal silicates, ammonium silicate, tetra(ethyl)ammonium silicate, phenyltrimethylammonium silicate, benzyltrimethylammonium silicate, guanidine silicate, and tetra(hydroxyethyl)ammonium silicate. The preferred silicates are sodium and potassium silicates, especially sodium metasilicate and potassium metasilicate.

In the preparation of the copolymers of the invention, the starting water-soluble silicate utilized can be added to an aqueous mixture, preferably an aqueous alcohol mixture, such as one containing ethylene glycol or the starting silicate can be formed in situ by adding the appropriate hydroxide (for instance, sodium hydroxide or potassium hydroxide) and silica to the reaction mixture. The hydroxy-substituted aliphatic silicone sulfonates can be added to an aqueous solution together with the starting water-soluble silicate. In addition, a silane precursor of the hydroxy-substituted aliphatic silicon sulfonate (siloxane) can be utilized to form the siloxane in situ. The presence of water converts said silane to the desired siloxane by hydrolysis and condensation. The siloxane so formed then reacts with the water-soluble silicate to produce the copolymer of this invention. The temperature at which the copolymers of this invention are formed can vary widely. Temperatures from 20° C. to 150° C. can be used. However, temperatures from 20° C. to 115° C. are preferred.

The copolymers of the invention are soluble in aqueous liquids, that is, in water or aqueous solutions of water-soluble materials such as water-soluble alcohols, for instance, ethylene glycol. Because these copolymers inhibit metal corrosion, metals below sodium in the electromotive series exhibit remarkably less corrosion when in contact with aqueous liquids containing the copolymers of this invention as compared with aqueous liquids without the corrosion inhibiting copolymers of this invention. Thus, the copolymers of the invention are particularly suited for the preparation of corrosion inhibiting aqueous media, i.e., coolants for use, for example, in the cooling system of internal combustion engines.

The copolymers of the invention also can be added to aqueous liquids to provide corrosion protection in which case the copolymer is uniformly dispersed throughout the liquid by any suitable means. Thus, in the case of moving liquids that are in contact with the metal to be protected, the copolymer can be added to the liquid while the liquid is in use and dispersion of the copolymer throughout the liquid can be achieved by the movement of the liquid. Addition of the copolymer to a liquid prior to its use in contact with a metal to be protected allows the copolymer to be dispersed throughout the liquid, for instance, by stirring the liquid.

The copolymers of this invention are generally useful for the protection of metals that come into contact with an aqueous liquid. Suitable liquids are pure water, aqueous solutions containing inorganic solutes and solutions containing water and water-soluble organic compounds, especially water soluble or miscible organic liquids. Illustrative of suitable aqueous solutions containing inorganic solutes are aqueous sodium or potassium chloride, refrigerating solutions, corrosive well water or river water containing chlorides, carbonates and sulfates which may be used as process or cooling water in industry, and the like. Illustrative of suitable solutions containing water and a water-soluble organic liquid are solutions containing water and monohydric or polyhydric alcohols (e.g., methanol, ethanol, propanol, ethylene glycol, propylene glycol and glycerol), hydroxy and alkoxy end blocked polyalkylene oxides (such as hydroxyl end-blocked polyethylene oxide), sulfoxides (such as methylsulfoxide), formamides (such as dimethylformamide) or cyclic ethers free of olefinic unsaturation (such as tetrahydrofuran, dioxane and the like). Suitable solutions containing water and a water-soluble orgaic liquid should contain at least 0.1 part by weight, or preferably, at least about 5.0 parts by weight of water per 100 parts by weight of the total weight of the water and the organic liquid.

The copolymers of this invention are generally useful in the protection of all metals and alloys that are used in industrial processes and apparatus. Metals whose corrosion is retarded by the copolymers of this invention include the metals below sodium in the electromotive series (e.g., magnesiuim, aluminum, copper, iron, manganese, nickel, lead, silver, tin, beryllium and zinc) as well as the alloys of such metals (e.g., brass, bronze, solder alloys, steel and the like). Such metals are solids at 25° C. and normally become corroded when in prolonged contact with water, particularly when the water is at elevated temperatures and/or contains electrolytes (e.g., acidic solutes). The copolymers of this invention are particularly useful in the protection of brass, iron, copper and aluminum.

The amount of the copolymers of this invention used in inhibiting corrosion of metals in contact with aqueous liquids is dependent upon the temperature, type of metal or metals being protected, type of any organic liquid in the solution, pH of the aqueous liquid, velocity of the aqueous liquid, inorganic solutes (e.g., electrolytes such as chlorides, sulfates and bicarbonates) in the aqueous liquid and prior treatment or corrosion of the metal. Generally, from 0.01 part to about 5 parts by weight of the copolymer per 100 parts by weight of the aqueous liquid to which the inhibitor is added are useful. Preferably, about 0.02 part to about 2.0 parts by weight, and most preferably, about 0.025 part to about 1 part by weight of the copolymer per 100 parts by weight of the aqueous liquid are used.

Compared with known inhibitors used in preventing corrosion of metals that are in contact with water, the copolymers of this invention provide numerous advantages. Thus, the copolymers can be added to a wide variety of aqueous solutions and inhibit the corrosion of a wide variety of metals. In addition, the copolymers are effective over a wide temperature range and these inhibitors do not cause the liquids in which they are employed to foam excessively. Furthermore, these copolymers do not promote the decomposition of any organic liquids present in the liquid nor do they attack other organic materials with which the liquid may come in contact.

The copolymers of the invention are useful in preventing the corrosion of metals that are cleaned by corrosive solutions or that are used in cooling coils, boilers, refrigeration and air conditioning equipment, heat exchange tubes, storage tanks for liquids, pipes, solvent containers, tank cars, ballast tanks containing sea water and the like. The copolymers of this invention are particularly useful for inhibiting the corrosion of the metals in the cooling system of an internal combustion engine in contact with an aqueous alcohol coolant composition.

Inhibited alcohol compositions containing an alcohol and a copolymer of this invention as a corrosion inhibitor are remarkably useful as antifreezes and coolants for the cooling system of an internal combustion engine. These antifreezes are inhibited alcohol solutions containing relatively large amounts of water. The antifreeze concentrates used in making the antifreeze or coolant composition are adapted to economical shipment and storage. The coolants are adapted to use as heat transfer media in the cooling system of internal combustion engines. In practice, the antifreeze concentrate can be shipped to the point where it is to be added to the cooling system and normally diluted to form a coolant. Water imparts desirable properties to both the concentrate and coolant compositions (e.g., large amounts of water impart good heat transfer properties to the coolant compositions). These coolant compositions generally contain from 1 part by weight to about 900 parts by weight of water per 100 parts by weight of the antifreeze concentrate. It is preferable that the coolant compositions contain about 30 to about 900 parts by weight of water per 100 parts by weight of said concentrate. Generally, the concentrates contain from 0.1 part to about 10 parts by weight (or preferably about 2 parts to about 5 parts by weight) of water per 100 parts by weight of said concentrate. The relative amount of water and alcohol in these compositions can be varied to adjust the freezing point of the compositions by the desired amount. The above-described inhibited alcohol compositions can be formed in any convenient manner, e.g., by adding an alcohol, the organosilicon inhibitor, and water to a container and stirring the mixture.

The pH of the inhibited aqueous alcohol compositions of this invention should be greater than seven to minimize corrosion of metals with which the compositions come into contact. Generally, the pH of the antifreeze concentrate or coolant composition is about 8 to about 12, preferably about 8 to about 11, and most preferably about 8.5 to about 10. The pH is maintained within the above ranges by the addition of conventional pH buffers such as salts of strong bases and weak acids, as are disclosed in U.S. Pat. No. 3,121,692, incorporated herein by reference.

The effectiveness as metal corrosion inhibitors of the copolymers of the invention is a function of the retention of the solubility characteristics of the copolymer in an aqueous media, i.e., to remain effective, the copolymers must not precipitate or form gels during the effective life of the inhibited aqueous media.

If desired, various additives can be added to the above-described inhibited alcohol compositions in particular instances for imparting special properties. By way of illustration, anti-foam agents, identifying dyes, pH indicators, conventional corrosion inhibitors, sealants which prevent leakage of the coolant from the cooling system, anti-creep agents which prevent seepage of the coolant into the crankcase and the like can be added to these compositions.

Useful antifoam agents are alkoxylated nonionic surfactants which exhibit low-foaming characteristics. Examples of alkoxylated nonionic synthetic detergents which can be advantageously employed as antifoam agents in the antifreeze compositions of the invention include polyoxyalkylene adducts of hydrophobic bases, as illustrated by PLURONIC®L-61. Typical hydrophobic bases which can be condensed with alkylene oxides are the mono- and polyalkylphenols and the compounds prepared by condensing polyoxypropylene with a hydrophobic base initiator having from about 1 to 6 carbon atoms and at least one reactive hydrogen atom. Additional useful defoamers based upon nonionic surfactants are disclosed in U.S. Pat. No. 3,931,029, incorporated herein by reference. Useful water-pump lubricants are known in the prior art.

Conventional corrosion inhibitors and/or alkaline pH buffers which can be used under aqueous alkaline conditions in combination with the copolymer corrosion inhibitors of the invention include water-soluble metal salts such as the alkali metal carbonates, borax, the alkali metal dichromates, the alkali metal phosphates, the alkali metal tungstates, the alkali metal salts of benzoic or toluic acid, the alkali metal salts of phenol, benzotriazole or tolyltriazole, lower alkanolamines ($C_2$–$C_6$), for instance, triethanolamine, alkali metal nitrates, alkali metal nitrites, alkali metal molybdates, and alkali metal mercaptobenzothiazoles. Such conventional corrosion inhibitors are used under alkaline conditions in an amount effective to inhibit corrosion. Generally, conventional corrosion inhibitors are used in the amount of about 0.03 parts to about 5 parts by weight, preferably about 0.1 to about 2.0 parts by weight per 100 parts total weight of the antifreeze concentrate.

Many antifreeze compositions can be formulated in accordance with the teachings of the present invention. The compositions described below are merely representative of the heat transfer or antifreeze compositions contemplated by the invention. Where not otherwise specified throughout this specification and claims, temperatures are given in degrees centigrade and parts, percentages and proportions are by weight.

TEST METHOD

In order to demonstrate the effectiveness of said hydroxy-substituted silicone sulfonates as gel stabilizers for aqueous solutions of water-soluble silicates, the copolymers of the invention were formed by mixing at ambient temperature and pressure said hydroxy-substituted silicone sulfonates with a water-soluble silicate in a mixture of distilled water and antifreeze grade ethylene glycol. Samples were placed in sealed glass jars, aged at a temperature of 180° F. and a pH of 8 over a period of about 2 weeks, and observed for the appearance of gelation. The structurally closest siloxanes were utilized as controls in separate concentrates. Each of the solutions were run in triplicate and contained 3 percent by weight distilled water, 0.4 percent by weight of sodium metasilicate ($Na_2SiO_3 \cdot 5H_2O$), the calculated amount of siloxane in weight percent, as noted below, so as to provide an equimolar amount in comparison with the control sample, and the balance antifreeze grade ethylene glycol which contains about 5 percent diethylene glycol. The silicate is in the form, $NaOSiO_{1.5}$ in aqueous solution.

EXAMPLE 1

3-(Sodium sulfo-2-hydroxy-oxypropyl)propyl siloxane in the average form

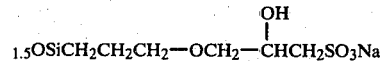

in aqueous solution was utilized in the amount of 0.01 weight percent. After two weeks at 180° F., the sample utilizing this level of siloxane showed no indication of gelation.

EXAMPLE 2

Example 1 was repeated except that 0.02 weight percent of siloxane was used. After two weeks at 180° F., there was no indication of gelation.

EXAMPLE 3

Example 1 was repeated except that 0.04 weight percent of siloxane was used. After two weeks at 180° F., no gelation appeared.

EXAMPLE 4

(Control forming no part of this invention)

(2-3-Dihydroxyoxypropyl)-propyl siloxane was utilized in the amount of 0.007 weight percent. No gelation occured after two weeks at 180° F.

EXAMPLE 5

(Control forming no part of this invention)

Example 4 was repeated except that 0.014 weight percent was utilized. Gel formation occurred after two days at 180° F.

EXAMPLE 6

(Control forming no part of this invention)

Example 4 was repeated except that 0.029 weight percent was utilized. After 11 days at 180° F., gel formation occurred.

EXAMPLE 7

The procedure of Example 3 is repeated substituting (3-sodiumsulfo-4-hydroxy cyclohexyl)ethyl siloxane for the siloxane of Example 3. In aqueous media, this has the average formula

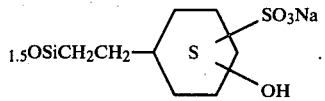

No gel is formed.

While this invention has been described with reference to certain specific embodiments, it will be recognized by those skilled in this art that many variations are possible without departing from the scope and spirit of the invention and it will be understood that it is intended to cover all changes and modifications to the invention disclosed herein for the purposes of illustration which do not constitute departures from the spirit and scope of the invention.

The embodiments of the invention in which an exclusive privilege or property is claimed are defined as follows:

1. An improved inhibited alcohol composition comprising an alcohol and a corrosion inhibiting amount of a copolymer consisting essentially of
   from 0.1 to 99.9 parts by weight of at least one silicone sulfonate unit derived from silicone sulfonates of the formula:

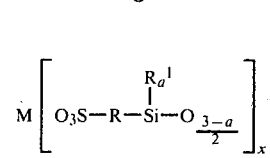

wherein M is a monovalent, divalent, or trivalent cation; x is 1 to 3 and equal to the valence of M; R is a hydroxy-substituted divalent group having 3 to about 18 carbon atoms and said hydroxy substituent is bonded to a carbon atom vicinal to the carbon atom to which the —O$_3$S— group is bonded; R$^1$ is a monovalent alkyl group having 1 to about 8 carbon atoms; and a is an integer of 0 to 2, and
from 0.1 to 99.9 parts by weight of at least one silicate unit derived from silicates of the formula:

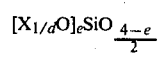

wherein X is a cation that forms a water-soluble silicate; d is the valence of the cation represented by X and has a value of at least 1; and e has a value of from 1 to 3, said parts by weight of said groups in said copolymer being based upon 100 parts by weight of said copolymer.

2. The composition of claim 1, wherein said copolymer contains silicone sulfonate units present as repeating units in said copolymer in an amount from about 15 to about 45 parts by weight and wherein said silicate units are present as repeating units in an amount from about 55 to about 85 parts by weight and said parts by weight of said groups in the copolymer are based upon 100 parts by weight of said copolymer and wherein R is selected from the group consisting of hydroxy-substituted alkylene and cycloalkylene, alkylene oxyalkylene, and cycloalkylene oxyalkylene and M is selected from the group consisting of alkali metal, ammonium, hydrogen, and tetraorganoammonium cations.

3. The composition of claim 2 wherein said copolymer consists essentially of silicone sulfonate units derived from silicone sulfonates of the formula:

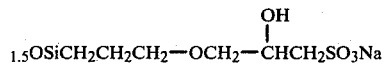

and silicate units derived from silicates of the formula:

4. The composition of claim 3 wherein X in said silicate unit of said copolymer is selected from the group consisting of at least one alkali metal, ammonium, and tetraorganoammonium cation and said silicone sulfonates have the formula:

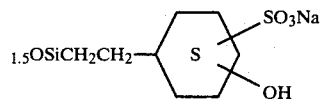

5. The composition of claim 3 or 4 wherein said alcohol comprises ethylene glycol and said alcohol composition additionally contains water.

6. The process of inhibiting the corrosion of metals below sodium in the electromotive series that come in contact with an aqueous liquid, said process comprising adding to said liquid or forming in situ a corrosion inhibiting amount of a copolymer consisting essentially of
from 0.1 to 99.9 parts by weight of at least one silicone sulfonate unit derived from silicone sulfonates of the formula:

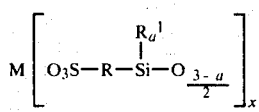

wherein M is a monovalent, divalent, or trivalent cation; x is 1 to 3 and equal to the valence of M; R is a hydroxy-substituted divalent group having 3 to about 18 carbon atoms and said hydroxy substituent is bonded to a carbon atom vicinal to the carbon atom to which the —$O_3S$— group is bonded; $R^1$ is a monovalent alkyl group having 1 to about 8 carbon atoms; and a is an integer of 0 to 2, and
from 0.1 to 99.9 parts by weight of at least one silicate unit derived from silicate of the formula:

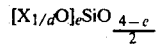

wherein X is a cation that forms a water-soluble silicate; d is the valence of the cation represented by X and has a value of at least 1; and e has a value of from 1 to 3, said parts by weight of said groups in said copolymer being based upon 100 parts by weight of said copolymer.

7. The process of claim 6 wherein said copolymer contains repeating silicone sulfonate units which are present in an amount of about 15 to about 45 parts by weight and repeating silicate units which are present in an amount of about 55 to about 85 parts by weight, said parts by weight of said groups in said copolymer being based upon 100 parts by weight of said copolymer.

8. The process of claim 7 wherein said metal is iron and said aqueous liquid is an aqueous ethylene glycol solution.

9. The process of claim 7 wherein said metal is aluminum and said aqueous liquid is an aqueous ethylene glycol solution.

10. The process of claim 6 wherein said silicone sulfonate units are derived from silicone sulfonates of the formula:

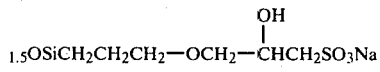

and wherein said silicate units are derived from silicates of the formula:

11. The process of claim 6 wherein said silicone sulfonate units are derived from silicone sulfonates of the formula:

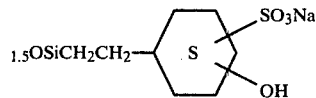

and wherein said silicate units are derived from silicates of the formula:
$NaOSiO_{1.5}$.

12. The composition of claim 6 wherein said silicone sulfonate units are present as repeating units of said copolymer in said copolymer an amount from about 15 to about 45 parts by weight and wherein said silicate units are present as repeating units in an amount of from about 55 to about 85 parts by weight and said parts by weight of said groups in the copolymer are based upon 100 parts by weight of said copolymer and wherein R is selected from the group consisting of hydroxy-substituted alkylene and cycloalkylene, alkylene oxyalkylene, and cycloalkylene oxyalkylene and M is selected from the group consisting of alkali metal, ammonium, hydrogen, and tetraorganoammonium cations.

* * * * *